April 15, 1947. C. DODEGGE 2,419,012
TICKET MACHINE
Filed Sept. 15, 1945 4 Sheets-Sheet 4

Inventor:
Carl Dodegge
By: Wallace and Cannon
Attorney

Patented Apr. 15, 1947

2,419,012

UNITED STATES PATENT OFFICE 2,419,012

TICKET MACHINE

Carl Dodegge, Maywood, Ill., assignor to Aero Metal Products Corporation, Chicago, Ill., a corporation of Illinois Application September 15, 1945, Serial No. 616,625

16 Claims. (Cl. 164—49)

This invention relates to a ticket machine of the character employed in theaters for dispensing tickets to customers.

The present invention is an improvement upon the ticket machine which forms the subject matter of my United States Patent No. 2,321,545 granted June 8, 1943, on a "Ticket machine."

In the ticket machine which forms the subject matter of my above-identified patent there are a plurality of ticket-issuing units all operated by a single electric motor and operating mechanisms including drive shafts under the control thereof, the drive shafts of the several ticket-issuing units all being coupled together by means of suitable coupling devices so as to enable all of the operating mechanisms for the various ticket-issuing units to be driven from a single electric motor. While the ticket machine which forms the subject matter of my above-identified patent has been found to be quite satisfactory, it sometimes happens that the single electric motor of that ticket machine requires repair and such repairs are usually made by removing the motor from the machine and sending it to a repair shop or back to the factory where the ticket machine was manufactured. However, since only a single motor is employed in the ticket machine which forms the subject matter of my aforesaid patent the entire machine is rendered inoperative and idle in the absence of replacement parts, while the motor is being repaired and this is, of course, one disadvantage inherent in the use of such a ticket machine.

Moreover, the ticket-issuing mechanisms of the various ticket-issuing units of the ticket machine which forms the subject matter of my aforesaid patent also occasionally need repair and it is somewhat inconvenient to remove the particular ticket-issuing unit which needs repair since this requires uncoupling of the drive shaft section for the particular ticket-issuing unit which requires repair from the other coupled drive shaft sections for the other ticket-issuing units and in this instance the entire ticket machine is likewise rendered inoperative and idle while the necessary repairs are being made in certain ones of the ticket issuing units.

Accordingly, an object of the present invention is to provide a new and improved ticket machine which embodies a plurality of self-contained and independently operable ticket issuing units each of which embodies its own electric motor and operating mechanisms and is removably mounted in the machine so that it may readily be removed from the machine, as a unit, and repaired as and when necessary without interfering with the operation of the other ticket-issuing units embodied in the machine.

Another object of the invention is to provide a novel construction for removably mounting the new ticket issuing units in the casing of the new ticket machine.

An additional object of the present invention is to provide a ticket machine embodying a plurality of self-contained and independently operable ticket-issuing units any one of which may readily be removed from the casing of the machine for repair or replacement by a theater owner or operator by means of a simple manual operation and without the necessity for any special mechanical skill or experience.

A further object of the invention is to provide a novel device for adjusting the level or height of the keys of each of the ticket-issuing units embodied in the new ticket issuing unit relative to the horizontal top wall of the casing through openings in which the keys project.

Other and further objects of the present invention will be apparent from the following description and claims and are illustrated in the accompanying drawings which, by way of illustration, show a preferred embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 2:
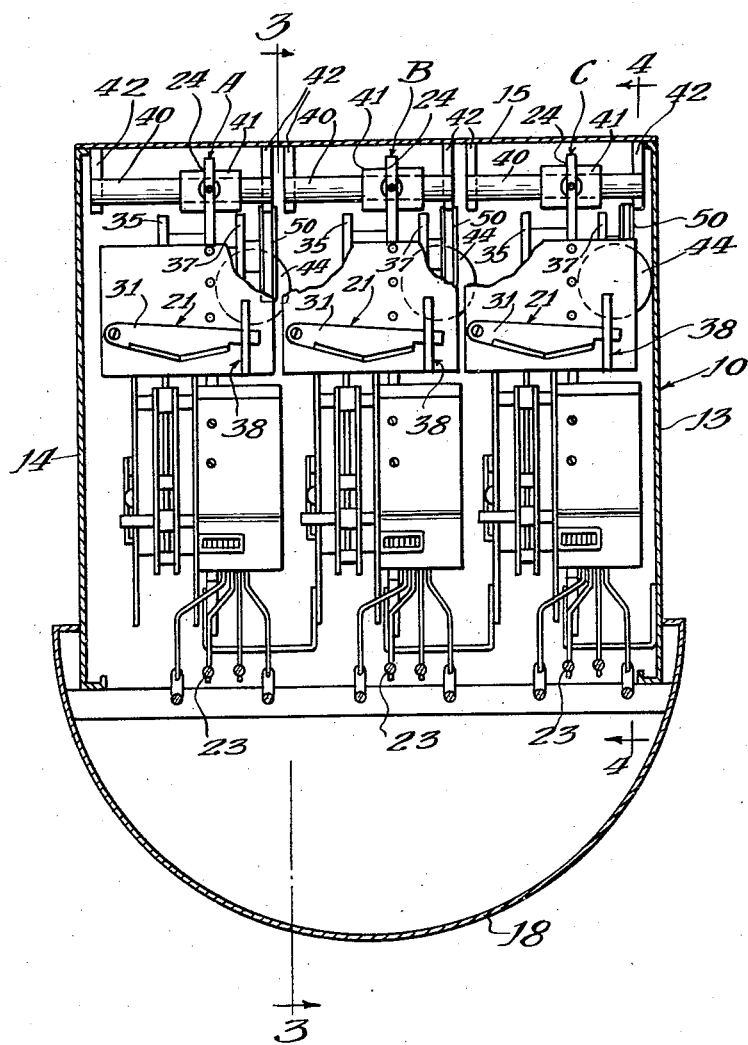
Fig. 2 is a partial sectional plan view, on line 2—2 in Fig. 1, showing the arrangement of the three ticket-issuing units embodied in the new ticket machine in position in the casing of the machine.
Figure 3:
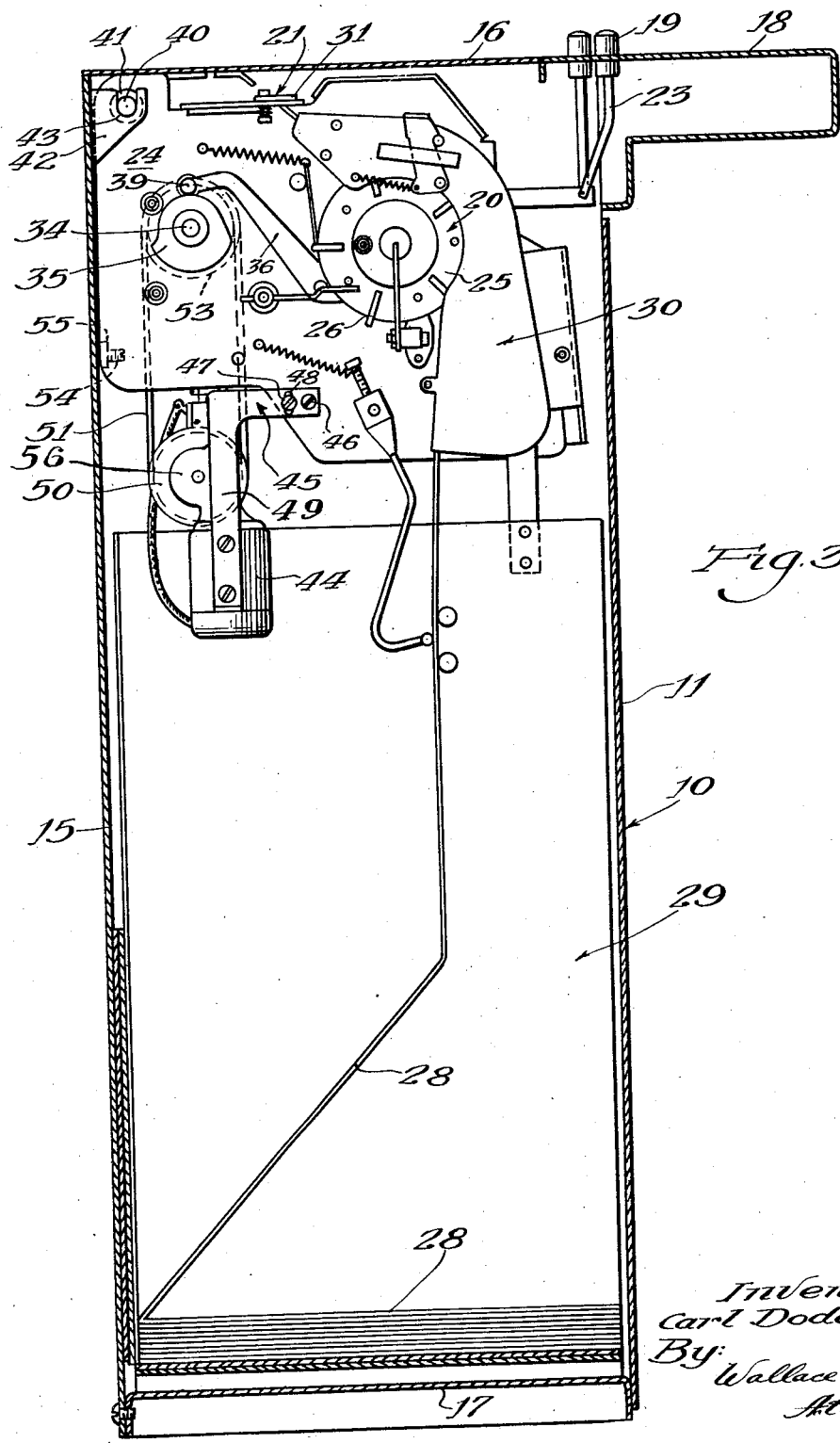
Figure 4:
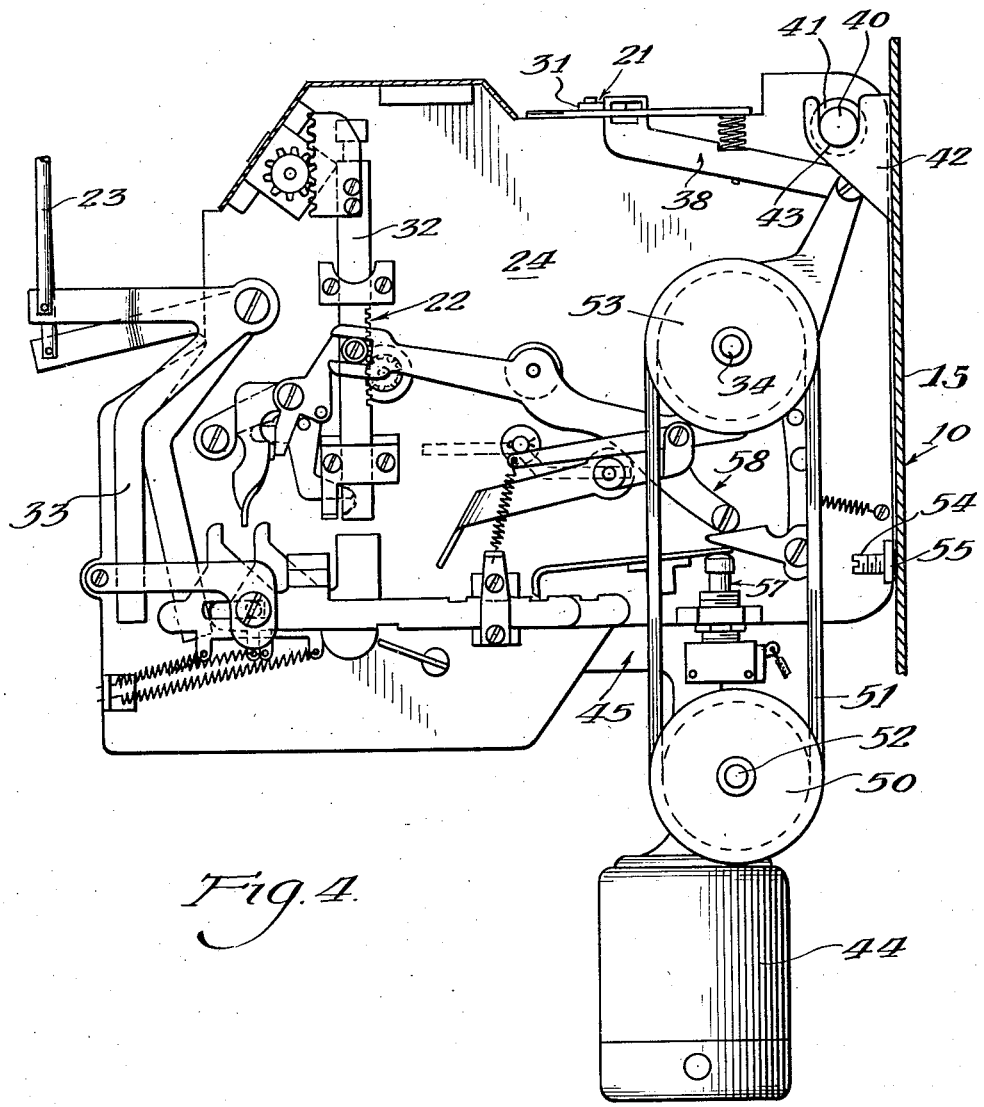

Fig. 3 is a partial sectional view on line 3—3 in Fig. 2 and illustrating the so-called "reel" side of one of the new ticket issuing units and also illustrating the ticket storage magazine associated therewith; and Fig. 4 is a view on line 4—4 in Fig. 2, partly in side elevation and partly in section, and illustrating the so-called "rack" side of the ticket-issuing unit which is illustrated in Fig. 3.

The ticket machine which forms the subject matter of the present invention is an improvement upon the ticket machine which forms the subject matter of my United States Patent No. 2,321,545 which was granted June 8, 1943, on a "Ticket machine" and reference may be had to that patent for a disclosure and description of the various parts of the ticket web-advancing device, ticket web-severing device and key-operated control mechanism which are embodied in the present ticket machine since these are identical to those shown and described in my aforesaid patent. Hence only those parts which represent changes and departures from the ticket machine which forms the subject matter of my aforesaid patent and which constitute the present invention will be described herein.

The ticket machine shown in my aforesaid patent, as well as the ticket machine which forms the subject matter of the present application, includes a casing 10 the construction of which is only fragmentarily shown herein, but which includes a front wall including a door 11 which is hinged as at 12 to the body of the casing 10. The casing 10 also includes side walls 13 and 14, a rear wall 15, a bottom wall 17, and a top wall 16, which is provided with suitable ticket issuing holes or openings (not shown) but which are shown and described in my aforesaid patent. In addition, the casing 10 includes a curved arm rest portion 18 which projects forwardly of the front wall 11 of the casing 10 at the top thereof (Fig. 3).

As shown in the drawings, the ticket machine therein illustrated includes three identical ticket-issuing units which are designated "A," "B" and "C" and since the mountings of these units according to the practice of the present invention are identical the mountings of only one ticket-issuing unit will be described herein.

Each of the ticket-issuing units A, B and C includes a bank of four manually operable keys 19 which are mounted in the top wall 16 of the casing 10 and each of the ticket-issuing units includes a ticket web-advancing unit, generally indicated at 20, a ticket web-severing unit, generally indicated at 21, and which includes a pivoted ticket web-severing knife 31, and a control mechanism which is generally indicated at 22, each of these control mechanisms 22 being under control of a bank of the manually operable keys 19 which are mounted on key stems 23.

Each of the ticket-issuing units A, B and C also includes a main and central supporting plate or frame 24 upon which the various operating mechanisms embodied in each ticket-issuing unit are mounted. Thus the ticket web-advancing mechanism 20 of each ticket-issuing unit is mounted upon one side of one of the supporting plates or frames 24 (Fig. 3) and the key-operated control mechanism 22 is mounted on the other side thereof (Fig. 4). Hence in my aforesaid patent the side of the supporting plate or frame 24 which is illustrated in Fig. 4 is referred to as the "rack side" since the principal operating member in each of the key-operated control mechanisms 22 is a slidable rack 32 which is under control of key levers 33 which are operated by the key stems 23 and keys 19.

Figure 1:
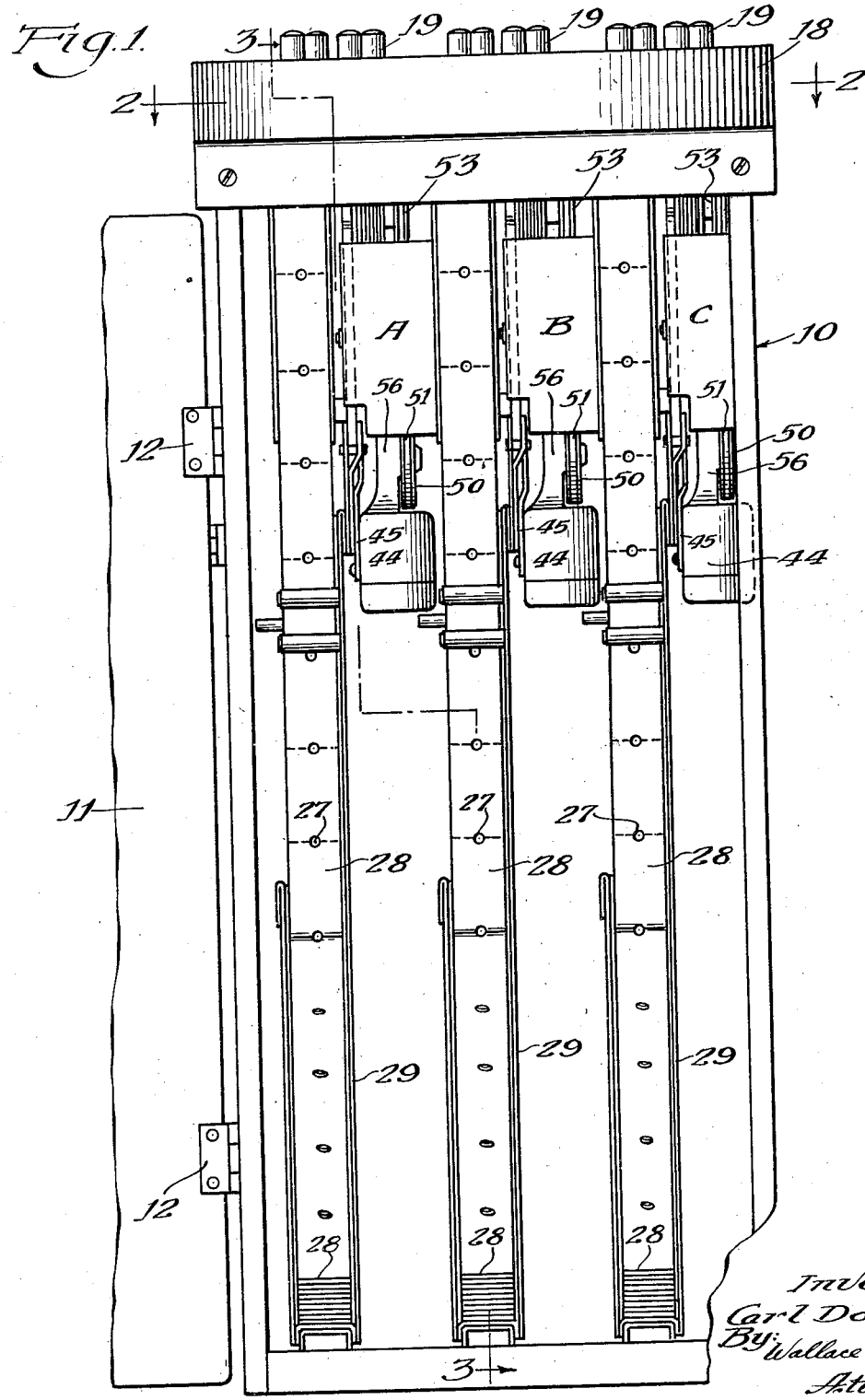
Fig. 1 is a front elevational view of a preferred embodiment of the new ticket machine, the front door of the casing or housing of the machine being shown in open position so as to show the interior of the casing or housing of the machine and the ticket storage magazines arranged therein.

Similarly, the side of each of the supporting plates or frames 24 which is illustrated in Fig. 3 is referred to in my aforesaid patent as the "reel side" of the supporting plate or frame 24 for the reason that each of the ticket web-advancing devices 20 includes a web-advancing reel 25 which has a plurality of pins 26 arranged radially therearound and these pins 26 are engageable in holes 27 which are provided in a ticket web 28. As shown in Figs. 1 and 3, the lower end portion of each of the ticket webs 28 is fan folded and the thus fan-folded lower end portion of each of the ticket webs 28 is arranged within a ticket storage magazine 29, these ticket storage magazines 29 being arranged in the lower portion of the casing 10 and being accessible by way of the door opening at the front of the casing which is normally closed by the door 11.

Each of the ticket webs 28 is fed through a guideway 30, arranged adjacent the corresponding ticket web-advancing reel 20, and upon operation of a selected one of the four keys 19 in one of the three banks of keys 19 the ticket web-advancing mechanism 20 of the actuated ticket-issuing unit A, B or C, including the web-advancing reel 25 embodied therein, is operated, under the control of the selected key 19 and associated control mechanism 22, to feed the ticket web 28 which is associated with the selected ticket-issuing unit A, B or C upwardly and partially through a ticket-dispensing opening in the top wall 16 of the casing 10 a sufficient distance to dispense the desired number of tickets purchased by the customer. The web-severing mechanism 21 of the selected ticket-issuing unit A, B or C is then operated in timed relationship with the ticket web-advancing device 20, to sever the proper length of ticket strip from one of the ticket webs 28 to free and dispense the desired number of tickets to the customer.

Each of the ticket issuing units A, B and C includes a main horizontally extending drive shaft 34, which is suitably journaled upon the supporting frame 24. Each of these main drive shafts 34 has a reel-controlling cam 35 mounted thereon on the "reel side" of the supporting frame 24 (Fig. 3). A cam roller 39 rides each of the cams 35 and each of these cam rollers 39 is carried by control lever 36 which is pivotally mounted on the supporting frame 24. Each of these control levers 36 indirectly controls the operation of the web-advancing reel 20 in the corresponding ticket issuing unit A, B or C in a manner which is fully disclosed in my aforesaid patent.

A knife-controlling cam 37 (Fig. 2) is mounted on the main drive shaft 34 of each of the ticket-issuing units A, B and C on the opposite side of the supporting frame 24 from the "reel controlling" cam 35, that is to say, on the "rack" side of the supporting frame 24. A lever mechanism 38 is associated with each of the knife-controlling cams 37 and each of these lever mechanisms 38 controls the operation of the pivoted web-severing knife 31 in the same ticket-issuing unit, as described in my aforesaid patent.

In the ticket machine which forms the subject matter of my aforesaid patent, the main drive shafts for the operating mechanisms of the several ticket-issuing units are all coupled together by means of coupling devices and are driven by a single electric motor and power-transmission mechanism associated therewith. As pointed out hereinbefore, with this arrangement all of the several ticket-issuing units of the machine are rendered inoperative in the event of failure of the single operating motor, and in the event of failure of the operating mechanism of any one of the ticket-issuing units it is necessary to uncouple the drive shafts of the several ticket-issuing units in order to remove from the machine the particular ticket-issuing unit which is in need of repair. However, in the ticket machine which forms the subject matter of the present invention the foregoing difficulties are eliminated by the novel mounting of each of the ticket-issuing units A, B and C in the casing and by the provision of a separate operating motor and power-transmission mechanism for each ticket-issuing unit.

To this end each of the ticket-issuing units A, B and C includes a mounting or hanger shaft or rod 40 and each of these mounting shafts or rods 40 is mounted in a tubular bearing sleeve 41, each of the tubular bearing sleeves 41 being mounted in a suitable opening provided therefor in one of the supporting frames or plates 24. Each end portion of each of the mounting or hanger shafts 40 rests in, and is free to turn slightly in, a concave bearing recess 43 which is provided in a mounting or hanger bracket 42 and a pair of these mounting or hanger brackets 42 are attached, as a unit, to the upper end portion of the vertical rear wall 15 of the casing 10, there being one bracket 42 in each pair or hanger bracket unit at each side of each of the ticket-issuing units A, B and C (Fig. 2). In this manner each of the ticket-issuing units A, B and C is removably suspended in the casing 10.

Each of the ticket-issuing units A, B and C includes an electric operating motor 44 which is adapted to be electrically connected to a suitable source of electric current, and each of these operating motors 44 is mounted on an L-shaped supporting bracket 45. A speed reduction gear unit, indicated at 56 (Figs. 1 and 3) is associated with each of the operating motors 44. The upper arm of each of the L-shaped motor supporting brackets 45 is pivotally mounted at its upper end, as by means of a screw 46, upon the corresponding supporting frame 24 and the upper arm of each of the supporting brackets 45 is adjustably mounted upon the corresponding supporting frame 24 by means of a screw and slot connection 47—48 (Fig. 3).

Each of the motor-mounting brackets 45 has an arm 49 to which the motor 44 is attached a pulley 50 is rotatably mounted on reduction gear unit 56, as at 52, and a power-transmission member in the form of a belt 51 works around the pulley 50. Each of the belts 51 also works around a pulley 53 and one of the pulleys 53 is mounted on each of the main drive shafts 34.

Each of the ticket-issuing units A, B and C includes a control switch 57 for the electric operating motor 44 embodied therein and each of the motor control switches 57 is under control of certain of the operating parts 58 of the key-operated control mechanism 22 in each ticket-issuing unit, as disclosed in my aforesaid patent in connection with the control switch for the single operating motor which is embodied in the ticket machine which forms the subject matter of that patent.

The present invention includes means for adjusting the heighth of the keys 19 in each of the ticket-issuing units A, B and C relative to the top wall 17—18 of the casing 10. To this end a set screw 54 is adjustably mounted in a screw threaded mounting block 55, one of which is attached to each of the supporting frames 24, and the inner end portion of each of the set screws 54 bears against the inner surface of the rear wall 14 of the casing 10, for a purpose which will be described presently.

In the use of the new ticket machine the several ticket-issuing units A, B and C, when assembled, may be inserted into position in the casing 10 by opening the top wall 15 thereof, the ticket-issuing units A, B and C being dropped into position by engaging each of the mounting shafts 40 in the bearing surfaces 43 of a pair of the supporting brackets 42. The leading end portions of the ticket webs 28 may then be fed up out of the storage magazines 29 through the guideways 30 and over the web-advancing reels 25 of the web-advancing devices 20, and up to the web-severing devices 21.

When a selected one of the manually operable keys 19 in one of the ticket-issuing units A, B or C is operated it will act through the key stem 23, key lever 33 and control mechanism 22, including rack 32 and lever mechanism 58, to close the control switch 57 for the operating motor 44 of the particular ticket-issuing unit which has been actuated. The operating motor 44 thus energized will thereupon act through the speed reduction gear unit 56, pulley 50, belt 51, and pulley 53 to rotate the main operating shaft 34 of the ticket-issuing unit which has been actuated, thereby rotating the cam 35 which controls the operations of the web-advancing mechanism 20, including the web-advancing reel 25, and the cam 37 which controls the operation of the lever mechanism 38 which operates the web-severing device 21 including the web-severing knife 31 embodied therein. The web-advancing mechanism 20 and the web-severing device 21 are then operated, in a manner described in my aforesaid patent, to advance the ticket web 28 and to sever therefrom a strip which embodies the proper number of tickets purchased by the customer.

If and when the operating motor 44 of any one of the ticket-issuing units A, B or C becomes inoperative or requires repair the entire ticket-issuing unit in which the particular operating motor 44 requiring repair is embodied, including the operating motor 44, power-transmission pulleys 50 and 53 and belt 51, the web-advancing mechanism 20, the web-severing mechanism 21, and the key-operated control mechanism 22, may be manually lifted up out of the casing 10 and returned to the factory or repair shop for repair. This removal of the defective ticket-issuing unit A, B or C may readily be accomplished by any theater owner or operator and without the necessity for or exercise of any special mechanical skill by merely opening the top wall 15 of the casing 10, grasping the supporting frame 24 of the ticket-issuing unit which needs repair, and then lifting the entire ticket-issuing unit up out of the casing 10. During this operation the mounting shaft 40 of the ticket-issuing unit which is being removed for repair is raised up out of the concave bearing recesses in the supporting brackets 42.

After the operating motor 44, or the operating mechanisms embodied in the ticket-issuing unit which has thus been removed from the casing 10, have been repaired the entire ticket-issuing unit thus repaired may be replaced in the casing 10 by merely dropping it into its proper position in the casing 10, the mounting shaft 40 for the ticket-issuing unit which has been repaired being lowered into the bearing recesses 43 in the two spaced bearing brackets 42 which support that particular ticket-issuing unit.

After the thus repaired ticket-issuing unit has been lowered into the casing 10 the keys 19 in the ticket-issuing unit thus replaced may be adjusted to the proper height, relative to the top wall 17—18 of the casing 10, by adjusting the set screw 54. When the set screw 54 is screwed inwardly in its mounting block 55 the axially outer end portion of the set screw 54 bears against the inner surface of the rear wall 14 of the casing 10. This movement of the set screw 54 against the relatively fixed rear wall 15 of the casing 10 causes the supporting frame 24 of the ticket-issuing unit in which the thus manipulated set screw 54 is mounted to pivot upon its mounting shaft 40, which then turns slightly in the bearing recesses 43 of the bearing brackets 42, relative to the casing 10 (clockwise as seen in Fig. 4) thereby raising the keys 19 in that particular ticket-issuing unit to the proper height relative to the horizontal top wall 16—18 of the casing 10. By rotating the set screw 54 in the opposite direction, that is, away from the rear wall 14 of the casing 10 the weight of the ticket-issuing unit will cause the same to drop or pivot downwardly on its mounting shaft 40, that is to say, counterclockwise as seen in Fig. 4, toward the rear wall 14 of the casing 10, thereby lowering the ticket keys 19 embodied in the thus adjusted ticket-issuing unit to the proper heighth relative to the top wall 16—18 of the casing 10.

Thus it will be seen that in the event of failure of the operating motor 44 or any of the parts of the web-advancing device 20, or of the web-severing device 21, or of the key-operated control mechanism 22 embodied in any of the ticket-issuing units A, B and C the particular ticket-issuing unit which requires repair may be readily removed from the casing 10 and returned to the factory or repair shop for repair without interfering with the operation of the other ticket-issuing units embodied in the new ticket machine. Moreover, such removal, repair and replacement of a defective ticket-issuing unit embodied in the new ticket machine may be accomplished without the expenditure of the time and labor which is required in uncoupling all of the drive shafts as is necessary in repairing the ticket machine which forms the subject matter of my aforesaid patent and then coupling all of the drive shafts together after necessary repairs have been made to the defective ticket-issuing unit as is required in repairing the ticket machine which forms the subject matter of my aforesaid patent. Moreover, the removal and replacement of any one of the ticket-issuing units A, B or C which are embodied in the ticket machine which forms the subject matter of the present ticket invention is a simple manual operation which may be performed by any theater owner or operator without the exercise of any special mechanical skill whereas the removal and replacement of a ticket-issuing unit from the ticket machine which forms the subject matter of my aforesaid patent is an operation which requires the services of a mechanic skilled in the practice of servicing and repairing such ticket machines.

It will thus be seen from the foregoing description, considered in conjunction with the accompanying drawings, that the present invention provides an improvement upon the ticket machine which forms the subject matter of my aforesaid patent and that the present invention has the desirable advantages and characteristics and accomplishes its intended objects including those hereinbefore pointed out and others which are inherent in the invention.

I claim:

1. A ticket machine comprising a casing; a plurality of independently operable ticket-issuing units in the said casing, each of said ticket-issuing units including a supporting frame, a ticket web advancing device, a ticket web-severing device, means for operating the said web-advancing device and the said web-severing device, a plurality of manually operable keys projecting from said casing and guided thereby, and means under the control of the said manually operable keys for controlling the operation of the said web-advancing device and of the said web-severing device; and means for removably mounting each of the said ticket-issuing units in the said casing whereby each of said ticket-issuing units may be operated entirely independently of the other ticket-issuing units in the said casing and whereby each of the said ticket-issuing units may be removed as a unit from the said casing without interfering with the operation of the other ticket-issuing units remaining therein.

2. In a ticket-issuing machine which includes a casing having therein a storage magazine for a ticket web; a self-contained ticket-issuing unit removably mounted in the said casing and including a supporting frame having the following devices mounted thereon: a ticket web-advancing device, a ticket web-severing device, a plurality of manually operable keys projecting from said casing and means under the control thereof for controlling the operation of the said ticket web-advancing device and of the said ticket web-severing device, and means for operating the said ticket web-advancing device and the said ticket web-severing device including an electric operating motor and a power transmission device mounted on the said supporting frame; and means for removably mounting the said ticket issuing unit in the said casing whereby the said supporting frame of the said ticket-issuing unit and all of the aforesaid devices mounted therein, including the said electric operating motor and the said power-transmission device operate thereby, may be removed from and replaced in the said casing as a unit for the purpose of repair or replacement of the said electric operating motor or other part or parts of the said ticket-issuing unit.

3. A ticket machine comprising a casing; a plurality of ticket-issuing units in the said casing, each of said ticket-issuing units including: a supporting frame, a ticket web-advancing device, a ticket web-severing device, means for operating the said web-advancing device and the said web-severing device, a plurality of manually operable keys, and means under the control of the said manually operable keys for controlling the operation of the said web-advancing device and of the said web-severing device; and means for removably mounting each of the said ticket-issuing units in the said casing whereby each of said ticket-issuing units may be operated entirely independently of the other ticket issuing units in the said casing and whereby each of the said ticket issuing units may be removed as a unit from the said casing without interfering with the operation of the other ticket issuing units remaining therein, each of said means for removably mounting each of the said ticket issuing units in the said casing including a hanger shaft attached to the said supporting frame of each of the said ticket issuing units and a hanger bracket unit attached to a wall on the said casing, and each of said hanger shafts being removably mounted upon one of the said hanger bracket units so as to enable each of the said ticket issuing units to be lowered into the said casing and suspended by its said hanger shaft from one of the said hanger bracket units.

4. A ticket machine comprising a casing; a plurality of ticket-issuing units in the said casing, each of said ticket-issuing units including: a supporting frame, a ticket web-advancing device, a ticket web-severing device, means for operating the said web-advancing device and the said web-severing device, a plurality of manually operable keys, and means under the control of the said manually operable keys for controlling the operation of the said web-advancing device and of the said web-severing device; and means for removably mounting each of the said ticket-issuing units in the said casing whereby each of said ticket-issuing units may be operated entirely independently of the other ticket issuing units in the said casing and whereby each of the said ticket issuing units may be removed as a unit from the said casing without interfering with the operation of the other ticket issuing units remaining therein, each of said means for removably mounting each of the said ticket issuing units in the said casing including a hanger shaft attached to the said supporting frame thereof and a pair of spaced hanger brackets attached to a wall of the said casing on the inner side thereof, and each of said brackets having a concave upper bearing surface for the removable reception of a portion of one of said hanger shafts.

5. A ticket machine comprising a casing; a plurality of ticket issuing units in the said casing, each of said ticket issuing units including: a supporting frame, a ticket web advancing device, a ticket web severing device, means for operating the said web advancing device and the said web severing device, a plurality of manually operable keys, and means under the control of the said manually operable keys for controlling the operation of the said web advancing device and of the said web severing device; and means for removably mounting each of the said ticket issuing units in the said casing whereby each of said ticket issuing units may be operated entirely independently of the other ticket issuing units in the said casing and whereby each of the said ticket issuing units may be removed as a unit from the said casing without interfering with the operation of the other ticket issuing units remaining therein, each of said means for removably mounting each of the said ticket issuing units in the said casing including a hanger shaft attached to the upper portion of each of the said supporting frames and a pair of spaced hanger brackets attached to a wall of the said casing on the inner side thereof, on opposite sides of the said supporting frame, and each of said hanger brackets having a concave upper bearing surface for the removable reception of a portion of one of said hanger shafts.

6. A ticket machine comprising a casing; a plurality of ticket issuing units in the said casing, each of said ticket issuing units including: a supporting frame, a ticket web advancing device, a ticket web severing device, means for operating the said web advancing device and the said web severing device, a plurality of manually operable keys, and means under the control of the said manually operable keys for controlling the operation of the said web advancing device and of the said web severing device; and means for removably mounting each of the said ticket issuing units in the said casing whereby each of said ticket issuing units may be operated entirely independently of the other ticket issuing units in the said casing and whereby each of the said ticket issuing units may be removed as a unit from the said casing without interfering with the operation of the other ticket issuing units remaining therein, said casing including a horizontal top wall having openings therein through which the said manually operable keys project, and said ticket machine including manually adjustable means for adjusting the height of the manually operable keys in each of the said ticket issuing units relative to the said horizontal top wall of the said casing.

7. A ticket machine comprising a casing; a plurality of ticket issuing units in the said casing, each of said ticket issuing units including: a supporting frame, a ticket web advancing device, a ticket web severing device, means for operating the said web advancing device and the said web severing device, a plurality of manually operable keys, and means under the control of the said manually operable keys for controlling the operation of the said web advancing device and of the said web severing device; and means for removably mounting each of the said ticket issuing units in the said casing whereby each of said ticket issuing units may be operated entirely independently of the other ticket issuing units in the said casing and whereby each of the said ticket issuing units may be removed as a unit from the said casing without interfering with the operation of the other ticket issuing units remaining therein, said casing including a horizontal top wall having openings therein through which the said manually operable keys project, and said ticket machine including manually adjustable means for adjusting the height of the manually operable keys in each of the said ticket issuing units relative to the said horizontal top wall of the said casing, said manually adjustable means for adjusting the height of the keys in each of the said ticket issuing units relative to the said horizontal top wall of the casing comprises a set screw carried by each of the said supporting frames and in which each of said set screws has an end portion bearing against the inner surface of the rear wall of the said casing.

8. In a ticket issuing machine which includes a casing having a portion for storing a ticket web, the combination of a self-contained ticket issuing unit removably mounted in the said casing and including a supporting frame having the following devices mounted thereon: a ticket web advancing device, a ticket web severing device, a plurality of manually operable keys and means under the control thereof for controlling the operation of the said ticket web advancing device and of the said ticket web severing device, means for operating the said ticket web advancing device and the said ticket web severing device including an electrically operable motor and a power transmission device mounted on the said supporting frame; and means for removably mounting the said ticket issuing unit in the said casing whereby the said supporting frame of the said ticket issuing unit and all of the aforesaid devices mounted thereon, including the said electrically operable motor and the said power transmission device operable thereby, may be removed from and replaced in the said casing as a unit for the purpose of repair or replacement of the said motor or other part or parts of the said ticket issuing unit, said means for removably mounting the said ticket issuing unit in the said casing including a hanger shaft attached to the said supporting frame and a hanger bracket unit attached to a wall of the said casing, said hanger shaft being removably mounted upon the said hanger bracket unit so as to enable the said ticket issuing unit to be lowered into the said casing and suspended by its said hanger shaft from the said hanger bracket unit.

9. In a ticket issuing machine which includes a casing having a portion for storing a ticket web, the combination of a complete and self-contained ticket issuing unit removably mounted in the said casing and including a supporting frame having the following devices mounted thereon: a ticket web advancing device, a ticket web severing device, a plurality of manually operable keys and means under the control thereof for controlling the operation of the said ticket web advancing device and of the said ticket web severing device, means for operating the said ticket web advancing device and the said ticket web severing device including an electrically operable motor and a power transmission device mounted on the said supporting frame; and means for removably mounting the said ticket issuing unit in the said casing whereby the said supporting frame of the said ticket issuing unit and all of the aforesaid devices mounted thereon, including the said electrically operable motor and the said power transmission device operable thereby, may be removed from and replaced in the said casing as a unit for the purpose of repair or replacement of the said motor or other part or parts of the said ticket issuing unit, said means for removably mounting the said ticket issuing unit in the said casing including a hanger shaft attached to the said supporting frame thereof and a pair of hanger brackets attached to a wall of the said casing on the inner side thereof and each having a concave upper bearing surface for the removable reception of a portion of the said hanger shaft.

10. In a ticket issuing machine which includes a casing having a portion for storing a ticket web, the combination of a self-contained ticket issuing unit removably mounted in the said casing and including a support frame having the following devices mounted thereon: a ticket web advancing device, a ticket web severing device, a plurality of manually operable keys and means under the control thereof for controlling the operation of the said ticket web advancing device and of the said ticket web severing device, means for operating the said ticket web advancing device and the said ticket web severing device including an electrically operable motor and a power transmission device mounted on the said supporting frame; and means for removably mounting the said ticket issuing unit in the said casing whereby the said supporting frame of the said ticket issuing unit and all of the aforesaid devices mounted thereon, including the said electrically operable motor and the said power transmission device operable thereby, may be removed from and replaced in the said casing as a unit for the purpose of repair or replacement of the said motor or other part or parts of the said ticket issuing unit, said means for removably mounting the said ticket issuing unit in the said casing including a hanger shaft attached to the upper portion of the said supporting frame thereof and a pair of hanger brackets attached to a wall of the said casing on the inner side thereof, and on opposite sides of the said supporting frame, each of said hanger brackets having a concave upper bearing surface for the removable reception of a portion of the said hanger shaft.

11. In a ticket issuing machine which includes a casing having a portion for storing a ticket web, the combination of a self-contained ticket issuing unit removably mounted in the said casing and including a support frame having the following devices mounted thereon: a ticket web advancing device, a ticket web severing device, a plurality of manually operable keys and means under the control thereof for controlling the operation of the said ticket web advancing device and of the said ticket web severing device, means for operating the said ticket web advancing device and the said ticket web severing device including an electrically operable motor and a power transmission device mounted on the said supporting frame; and means for removably mounting the said ticket issuing unit in the said casing whereby the said supporting frame of the said ticket issuing unit and all of the aforesaid devices mounted thereon, including the said electrically operable motor and the said power transmission device operable thereby, may be removed from and replaced in the said casing as a unit for the purpose of repair or replacement of the said motor or other part or parts of the said ticket issuing unit, said casing including a horizontal top wall having openings therein through which the said manually operable keys project, and said ticket issuing unit including manually adjustable means for adjusting the height of said manually operable keys relative to the said horizontal top wall of the said casing.

12. In a ticket issuing machine which includes a casing having a portion for storing a ticket web, the combination of a self-contained ticket issuing unit removably mounted in the said casing and including a support frame having the following devices mounted thereon: a ticket web advancing device, a ticket web severing device, a plurality of manually operable keys and means under the control thereof for controlling the operation of the said ticket web advancing device and of the said ticket web severing device, means for operating the said ticket web advancing device and the said ticket web severing device including an electrically operable motor and a power transmission device mounted on the said supporting frame; and means for removably mounting the said ticket issuing unit in the said casing whereby the said supporting frame of the said ticket issuing unit and all of the aforesaid devices mounted thereon, including the said electrically operable motor and the said power transmission device operable thereby, may be removed from and replaced in the said casing as a unit for the purpose of repair or replacement of the said motor or other part or parts of the said ticket issuing unit, said casing including a horizontal top wall having openings therein through which the said manually operable keys project, said ticket issuing unit including manually adjustable means for adjusting the height of said manually operable keys relative to the said horizontal top wall of the said casing, said manually adjustable means for adjusting the height of the keys in the said ticket issuing unit comprising a set screw carried by the said supporting frame and having an axially outer end portion bearing against the inner surface of the rear wall of the said casing.

13. A ticket machine comprising a casing having a plurality of openings formed therein, mounting means carried by one wall for independently supporting a plurality of ticket issuing units within said casing with each of said units in cooperative registration with a corresponding one of said openings for issuing tickets therethrough, each of said units being removable from said casing without moving the other of said units.

14. A ticket machine comprising a casing having a plurality of openings therein, a plurality of ticket issuing units having digitally operable members for initiating a ticket issuing cycle of operation thereof, and supporting means for removably mounting said ticket issuing units in ticket issuing position within said casing and with each of said digitally operable members of each of said units extending through a corresponding one of said openings to be guided by the casing during digital operation thereof, each of said units being removable from said supporting means and said casing without affecting the relationship between the other of said units and the supporting means.

15. In a ticket issuing machine including a casing, and a plurality of units for issuing tickets from said casing, each of said units including a supporting frame, a ticket web-advancing device, a ticket web-severing device, means for operating the said web-advancing device and the said web-severing device, a plurality of manually operable keys, and means under the control of said manually operable keys for controlling the operation of the said web-advancing device and the said web-severing device, the combination of a supporting member carried by each of said supporting frames, and supporting means adapted to releasably engage each of said supporting members to removably mount said ticket issuing units in ticket issuing position within said casing, each of said units being removable from said casing without moving any of the other of said units from operable position.

16. In a ticket issuing machine including a casing, and a plurality of units for issuing tickets from said casing, each of said units including a supporting frame, a ticket web-advancing device, a ticket web-severing device, means for operating the said web-advancing device and the said web-severing device, a plurality of manually operable keys, and means under the control of said manually operable keys for controlling the operation of the said web-advancing device and the said web-severing device, the combination of: a supporting member carried by each of said supporting frames, and supporting means for pivotally engaging each of said supporting members to mount said ticket issuing units in ticket issuing position within said casing, each of said ticket issuing units being pivotable upon its respective supporting member without disturbing any of the other said units.

CARL DODEGGE.

REFERENCES CITED

The following references are of record in the file of this patent:

UNITED STATES PATENTS

| Number | Name | Date |
|---|---|---|
| 1,128,721 | Ray | Feb. 16, 1915 |
| 1,797,771 | Helsel | Mar. 24, 1931 |
| 1,886,626 | Black | Nov. 8, 1932 |
| 1,945,218 | Fishburn | Jan. 30, 1934 |
| 2,171,898 | Scher | Sept. 5, 1939 |